(12) United States Patent
Shen et al.

(10) Patent No.: US 8,254,135 B2
(45) Date of Patent: Aug. 28, 2012

(54) SURFACE CONTACT CARD HOLDER FOR ELECTRONIC DEVICE

(75) Inventors: Jun Shen, Shenzhen (CN); Ping Gao, Shenzhen (CN); Xiu-Wen Yang, Shenzhen (CN)

(73) Assignees: Shenzhen Futaihong Precision Industry Co., Ltd., ShenZhen, Guangdong Province (CN); FIH (Hong Kong) Limited, Kowloon (HK)

(*) Notice: Subject to any disclaimer, the term of this patent is extended or adjusted under 35 U.S.C. 154(b) by 205 days.

(21) Appl. No.: 12/788,434

(22) Filed: May 27, 2010

(65) Prior Publication Data

US 2011/0157847 A1    Jun. 30, 2011

(30) Foreign Application Priority Data

Dec. 30, 2009   (CN) .......................... 2009 1 312731

(51) Int. Cl.
*H05K 7/12* (2006.01)
(52) U.S. Cl. .................................... 361/737; 439/946
(58) Field of Classification Search .................. 361/737; 439/945, 946
See application file for complete search history.

(56) References Cited

U.S. PATENT DOCUMENTS

| | | | | |
|---|---|---|---|---|
| 6,561,851 B2* | 5/2003 | Florescu | ....................... | 439/630 |
| 6,602,096 B1* | 8/2003 | Kronestedt et al. | ........... | 439/630 |
| 6,695,637 B1* | 2/2004 | Liu | ................ | 439/377 |
| 6,761,566 B2* | 7/2004 | Chin-Lung et al. | .......... | 439/76.1 |
| 6,805,570 B1* | 10/2004 | Lee | ................ | 439/326 |
| 7,081,020 B1* | 7/2006 | Lee | ................ | 439/630 |
| 7,112,075 B1* | 9/2006 | Su | ................ | 439/159 |
| 7,682,178 B2* | 3/2010 | Feng | ................ | 439/326 |
| 7,794,232 B2* | 9/2010 | Ogatsu | ......................... | 439/64 |
| 2004/0092149 A1* | 5/2004 | Scuteri et al. | ................ | 439/326 |
| 2011/0051391 A1* | 3/2011 | Wei et al. | ...................... | 361/818 |

* cited by examiner

*Primary Examiner* — Dameon Levi
(74) *Attorney, Agent, or Firm* — Altis Law Group, Inc.

(57) ABSTRACT

A holder for a surface contact card includes a first housing, a second housing, and a tray. The first housing defines a receiving hole. The second housing includes a cover portion. A tray is configured for carrying a surface contact card therein. The cover portion covers one part of the tray. The tray slidably engages in the receiving hole allowing insertion and removal of the surface contact card from inside the first housing and the second housing.

17 Claims, 5 Drawing Sheets

SURFACE CONTACT CARD HOLDER FOR ELECTRONIC DEVICE

BACKGROUND

1. Technical Field

The present disclosure generally relates to card use in electronic devices and, particularly, to a surface contact card holder for an electronic device.

2. Description of Related Art

Surface contact cards having special circuits are widely used in portable electronic devices to enhance or specialize the functions of the portable electronic devices. For example, a subscriber identity module (SIM) card in a mobile phone can dedicate the mobile phone's functions to the SIM card owner. By changing SIM cards, a single mobile phone can be used by many different SIM card owners as a personal phone.

Although surface contact card holders may be simple, it can be difficult for the surface contact card to be removed from the surface contact card holder.

Therefore, there is room for improvement within the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the surface contact card holder. Moreover, in the drawings, like reference numerals designate corresponding parts throughout the several views, in which.

DETAILED DESCRIPTION

The disclosed surface contact card holder can seat surface contact cards such as SIM cards, compact flash cards (CFs), multimedia cards (MMCs), and others. The disclosed electronic device, shown in the exemplary embodiment as a mobile phone, can alternatively be a PDA, camera, recorder, or other device, while remaining well within the scope of the disclosure.

Figure 1:
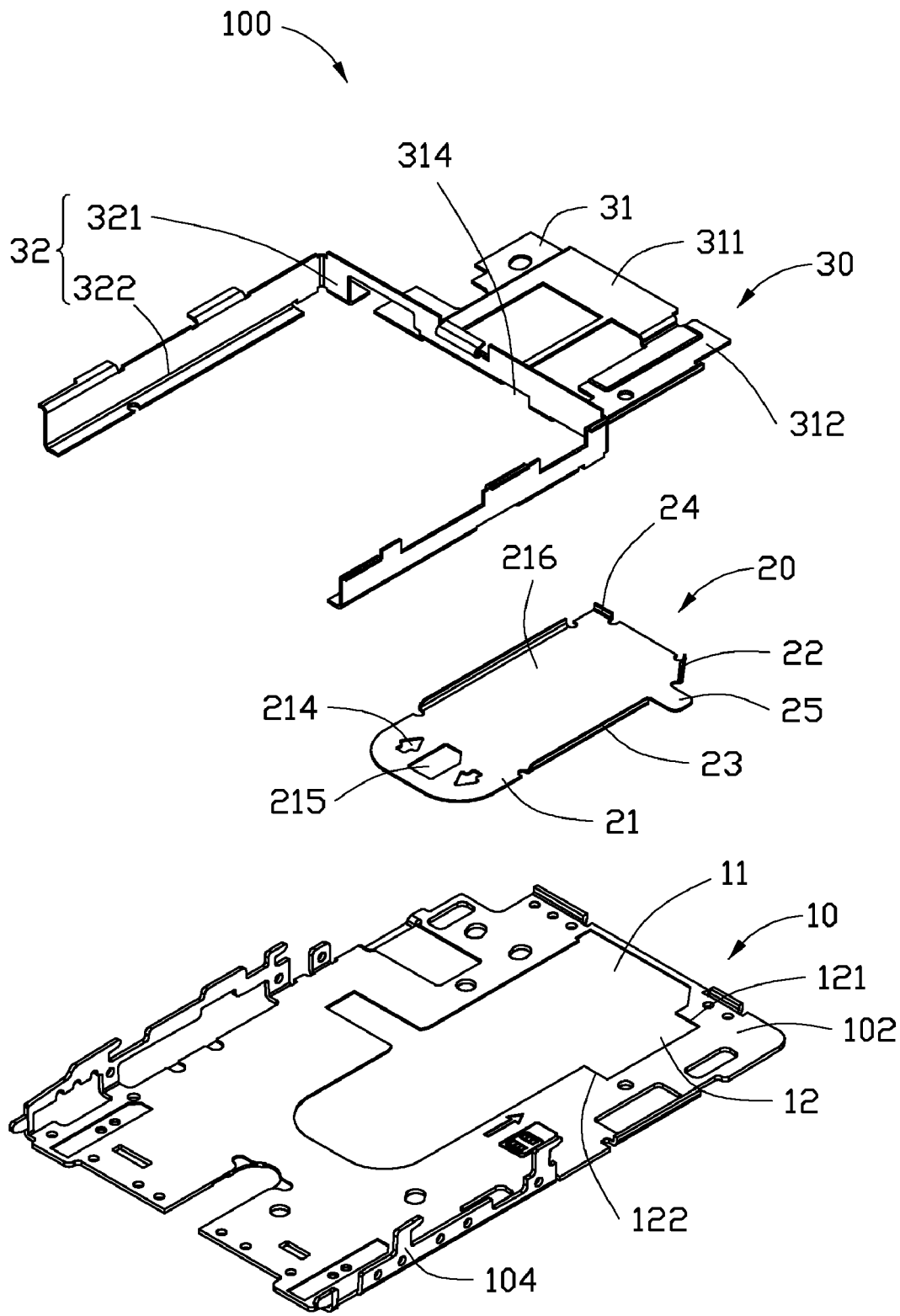
FIG. 1 is an exploded, isometric view of a surface contact card holder in accordance with an exemplary embodiment.

FIG. 1 shows a surface contact card holder 100 mounted on an electronic device. The surface contact card holder 100 includes a first housing 10, a tray 20, and a second housing 30. The tray 20 may be disposed between the first housing 10 and the second housing 30 to slidably receive a surface contact card.

The first housing 10 may be one portion of the electronic device, and includes a main section 102 integrally formed together with two sidewalls 104. The main section 102 defines a receiving hole 11 and a cutout 12. The cutout 12 is disposed at one side of the receiving hole 11, and communicates with the receiving hole 11. A first resisting edge 121 and a second resisting edge 122 are formed at two sides of the cutout 12 on the main section 102.

Figure 2:
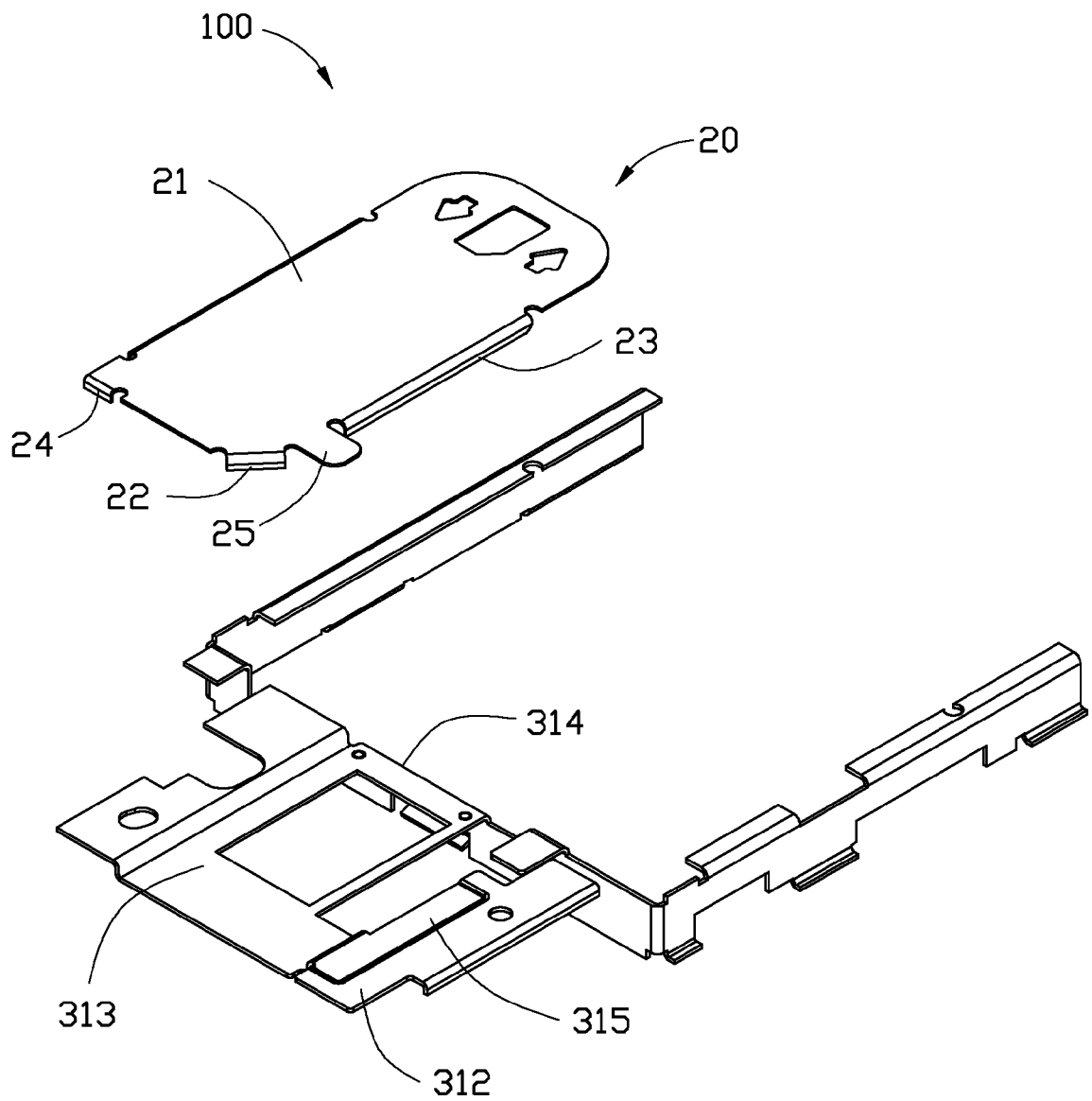
FIG. 2 is similar to FIG. 2, but shown from another aspect.

Referring to FIG. 2, the tray 20 includes a rectangular plate portion 21. A flange 23 protrudes from each long edge of the plate portion 21. Two arrows 214 pointing in opposite directions and a label 215 are formed on one end of the plate portion 21 for guiding users when installing or removing the surface contact card. A positioning wall 22 and a stopper wall 24 are perpendicularly formed at the other end of the plate portion 21. The flange 23, the positioning wall 22, the stopper wall 24, and the plate portion 21 cooperatively define a receiving compartment 216 to receive the surface contact card. A latching tab 25 extends from one long edge of the plate portion 21, and is disposed between one flange 23 and the positioning wall 22.

The second housing 30 is attached to the first housing 10, and includes a cover portion 31 and a frame portion 32 integrally formed together. The cover portion 31 includes a base plate 311 and two L-shape fixing plates 312 respectively extending from two sides of the base plate 311. A receiving groove 313 is surrounded by the fixing plates 312 and the base plate 311. One of the fixing plates 312 defines a slot 315 corresponding to the cutout 12. The frame portion 32 includes an end wall 321 and two extending walls 322 formed at the two ends of the end wall 321. The end wall 321 is integrally formed with one end of the base plate 311. An opening 314 is defined in the end wall 321 communicating with the receiving groove 313 of the cover portion 31.

Figure 3:
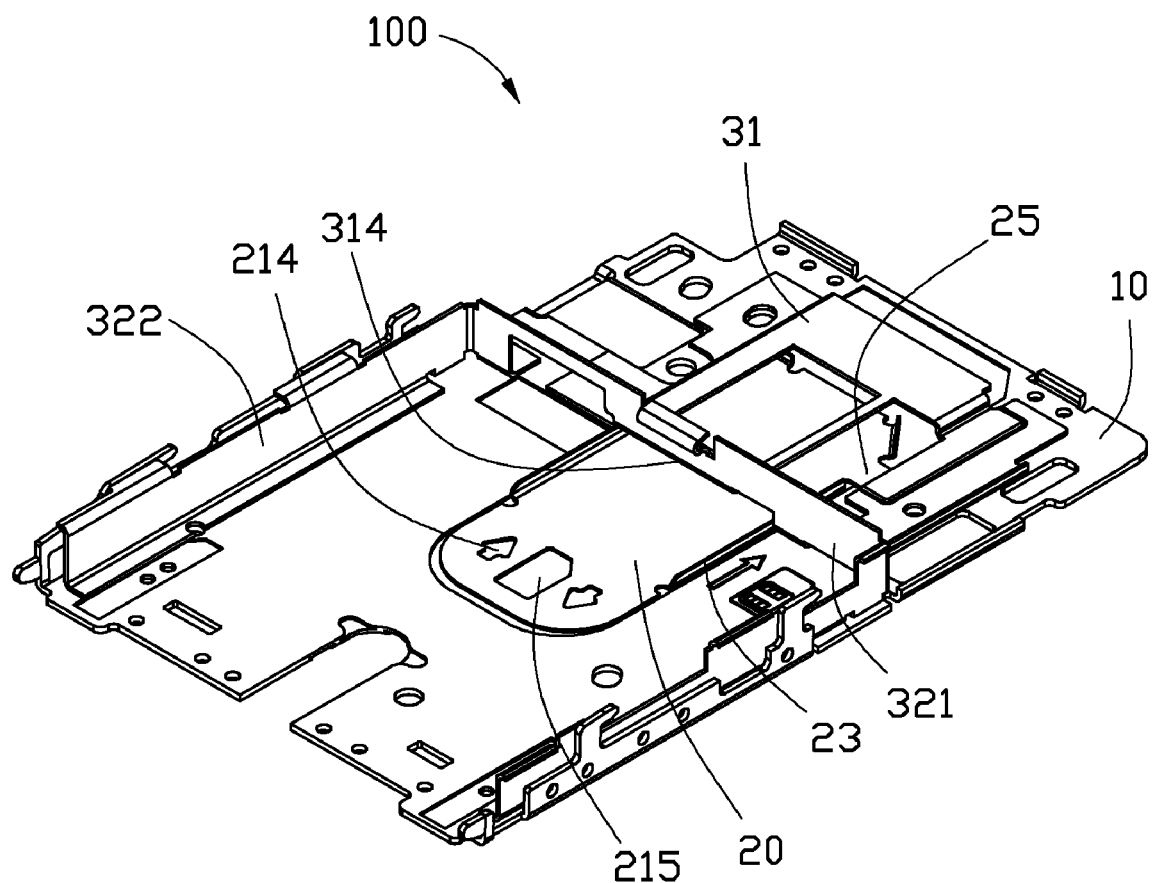
FIG. 3 is an assembly, isometric view of the surface contact card holder of FIGS. 1 and 2 with no surface contact card in place.

During assembly, referring to FIG. 3, the tray 20 is slidably received in the receiving hole 11 of the first housing 10, and the latching tab 25 is received in the cutout 12. The flange 23, the positioning wall 22, and the stopper wall 24 protrude from the receiving hole 11. Since a length of the receiving hole 11 is longer than the tray 20, the tray 20 may slide a distance within a predetermined range. Then, the second housing 30 is attached to the first housing 10. The extending walls 322 are latched with the sidewalls 104. The end wall 321 is across the tray 20. The base plate 311 of the cover portion 31 covers one part of the tray 20 with the positioning wall 22 and the stopper wall 24. The fixing plates 312 are fixed to the first housing 10. The slot 315 is aligned with the cutout 12 to receive the latching tab 25. The receiving groove 313 and the receiving compartment 216 provide a space to receive the surface contact card. The surface contact card holder 100 may be fixed to an electronic device. The tray 20 may be supported by a portion of the electronic device (not shown) to prevent the tray 20 from separating from the electronic device. The tray 20 may slide between the first housing 10 and the second housing 30.

Figure 4:
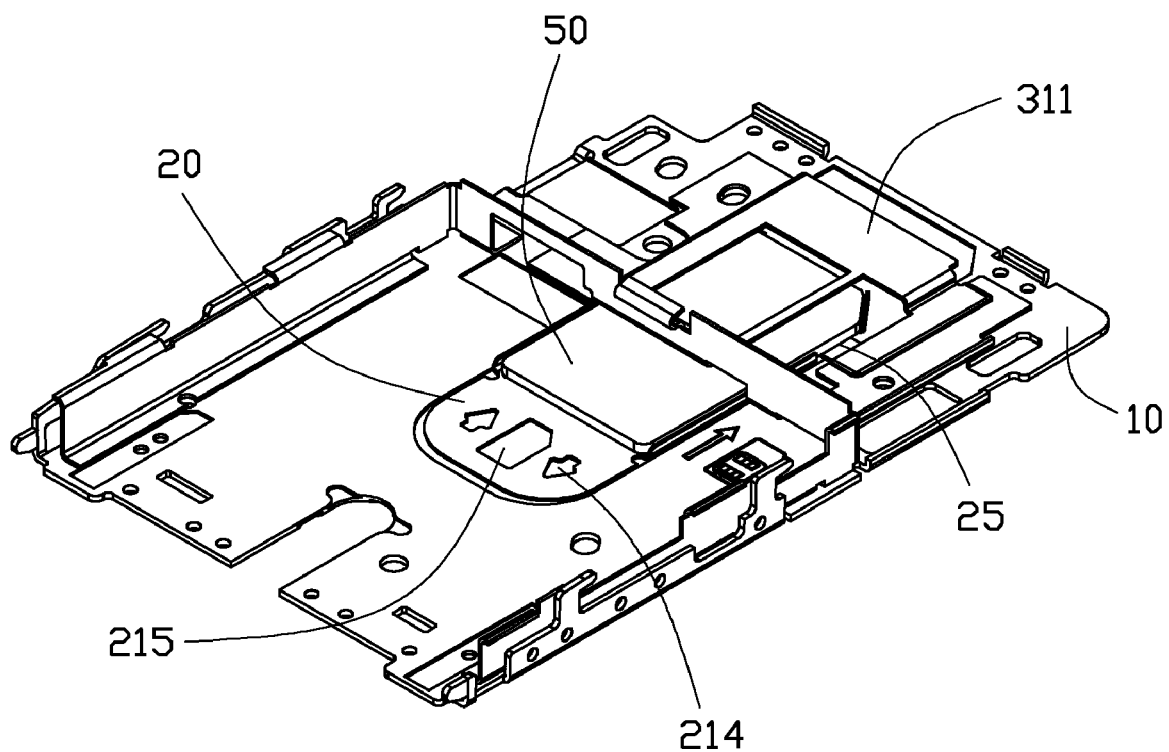
FIG. 4 is an assembling process view of the surface contact card holder with the surface contact card.
Figure 5:
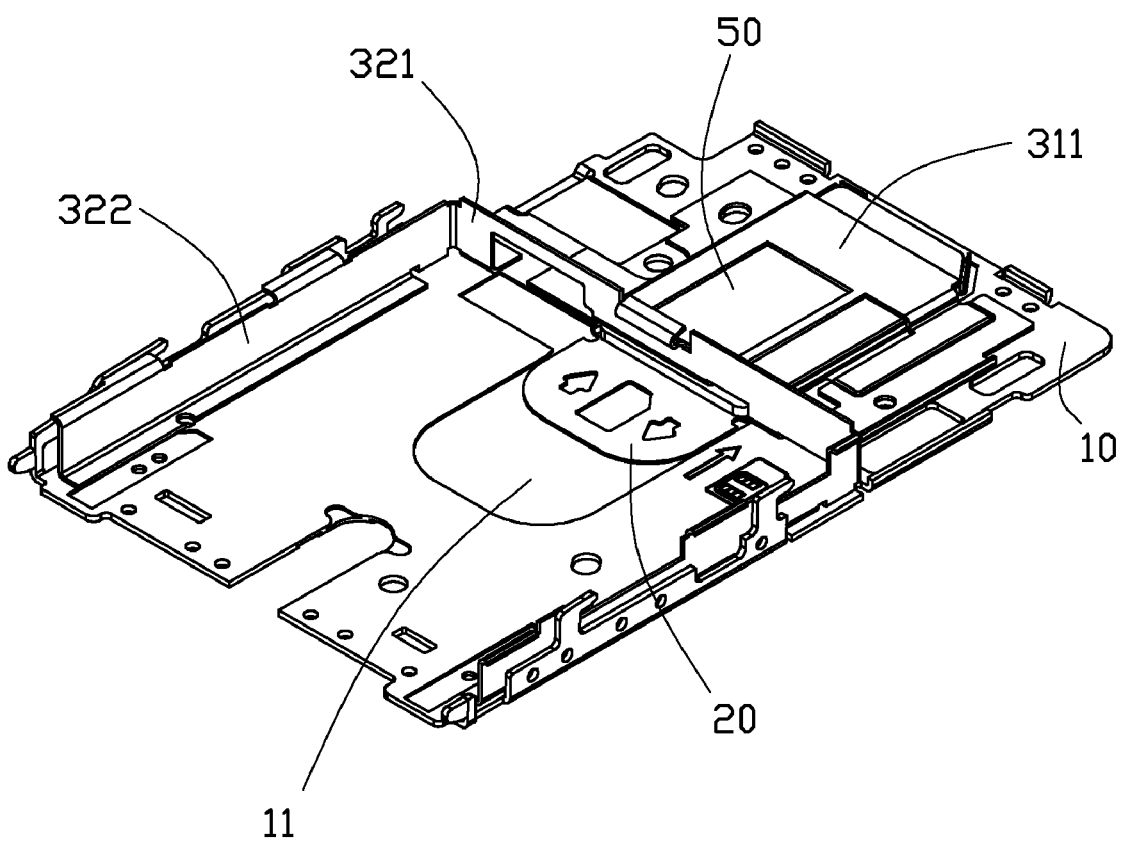
FIG. 5 is a schematic view of the surface contact card holder showing the surface contact card in place.

In use, referring to FIGS. 4 and 5, a surface contact card 50 is taken here as an exemplary application for the purposes of describing details of the surface contact holder 100. The surface contact card 50 is inserted into the tray 20 along the opening 314 to allow the surface contact card 50 to resist the positioning wall 22 and the stopper wall 24. The tray 20 with the surface contact card 50 is pushed to slide toward the cover portion 31 until the latching tab 25 resists the first edge 121. The surface contact card 50 is thereby held steadily in the first housing 10 and the second housing 30.

To remove the surface contact card 50, the tray 20 is pulled along the receiving hole 11 until the latching tab 25 resists the second edge 122, and surface contact card 50 is easily removed from the tray 20.

As described above, the exemplary embodiment provides a surface contact card holder for portable electronic devices, such as mobile phones. The surface contact card holder can be easily opened and more user-friendly.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A holder for a surface contact card, comprising:
   a first housing defining a receiving hole;
   a second housing including a cover portion; and
   a tray configured for carrying a surface contact card therein, the cover portion covering one part of the tray;
   wherein the tray slidably engages in the receiving hole allowing insertion and removal of the surface contact card from insider the first housing and the second housing; the first housing defines a cutout, the cutout is disposed at one side of the receiving hole, and communicates with the receiving hole; the tray includes a latching tab slidably received in the cutout to position the tray relative to the first housing.

2. The holder as claimed in claim 1, wherein the tray includes a rectangular plate portion and two flanges, the flanges protrude from the plate portion.

3. The holder as claimed in claim 2, wherein a positioning wall and a stopper wall are perpendicularly formed at one end of the plate portion to position the surface contact card.

4. The holder as claimed in claim 3, wherein a latching tab is disposed between one flange and the positioning wall.

5. The holder as claimed in claim 1, wherein the second housing includes a frame portion integrally formed with the cover portion, the frame portion includes an end wall and two extending walls formed at the two ends of the end wall, the end wall is integrally formed with one end of the cover portion.

6. The holder as claimed in claim 5, wherein the cover portion includes a base plate and two L-shape fixing plates respectively extending from two sides of the base plate, a receiving groove is surrounded by the fixing plates and the base plate.

7. The holder as claimed in claim 6, wherein one of the fixing plates defines a slot, an opening is defined in the end wall communicating with the receiving groove of the cover portion.

8. A portable electronic device comprising a holder for a surface contact card, the holder mounted on the portable electronic device and comprising:
   a first housing defining a receiving hole;
   a second housing including a cover portion; and
   a tray configured for carrying a surface contact card therein, the cover portion covering one part of the tray;
   wherein the tray slidably engages in the receiving hole allowing insertion and removal of the surface contact card from inside the first housing and the second housing; the first housing defines a cutout, the cutout is disposed at one side of the receiving hole, and communicates with the receiving hole, the tray includes a latching tab slidably received in the cutout to position the tray to the first housing.

9. The portable electronic device as claimed in claim 8, wherein the cover portion includes a base plate and two L-shape fixing plates respectively extending from two sides of the base plate, a receiving groove is surrounded by the fixing plates and the base plate.

10. The portable electronic device as claimed in claim 9, wherein the second housing includes a frame portion integrally formed with the cover portion, the frame portion includes an end wall and two extending walls formed at the two ends of the end wall, the end wall is integrally formed with one end of the cover portion.

11. A holder for a surface contact card, comprising:
    a first housing defining a receiving hole;
    a second housing including a cover portion; and
    a tray configured for carrying a surface contact card therein, the cover portion covering one part of the tray;
    wherein the tray slidably engages in the receiving hole allowing insertion and removal of the surface contact card from insider the first housing and the second housing; the first housing defines a cutout, the cutout is disposed at one side of the receiving hole, and communicates with the receiving hole; the tray includes a latching tab slidably received in the cutout; a first resisting edge and a second resisting edge are formed at two sides of the cutout on the first housing, the tray is capable of being pushed to slide toward the cover portion until the latching tab resists the first edge, and the tray is capable of being pulled away from the cover portion until the latching tab resists the second edge.

12. The holder as claimed in claim 11, wherein the tray includes a rectangular plate portion and two flanges, the flanges protrude from the plate portion.

13. The holder as claimed in claim 12, wherein a positioning wall and a stopper wall are perpendicularly formed at one end of the plate portion to position the surface contact card.

14. The holder as claimed in claim 13, wherein a latching tab is disposed between one flange and the positioning wall.

15. The holder as claimed in claim 11, wherein the second housing includes a frame portion integrally formed with the cover portion, the frame portion includes an end wall and two extending walls formed at the two ends of the end wall, the end wall is integrally formed with one end of the cover portion.

16. The holder as claimed in claim 15, wherein the cover portion includes a base plate and two L-shape fixing plates respectively extending from two sides of the base plate, a receiving groove is surrounded by the fixing plates and the base plate.

17. The holder as claimed in claim 16, wherein one of the fixing plates defines a slot, an opening is defined in the end wall communicating with the receiving groove of the cover portion.

* * * * *